United States Patent
Wiser et al.

[15] 3,676,725
[45] July 11, 1972

[54] MEANS CONNECTING A SYNCHRONOUS MOTOR TO A GEAR TRAIN HOUSING

[72] Inventors: Joseph E. Wiser; Peter H. Gerhardt, both of Indianapolis, Ind.

[73] Assignee: P. R. Lallory & Co., Inc., Indianapolis, Ind.

[22] Filed: Sept. 23, 1970

[21] Appl. No.: 74,599

[52] U.S. Cl...............................310/89, 310/83, 310/162
[51] Int. Cl.....................................................H02k 5/00
[58] Field of Search................310/162, 163, 164, 154, 66, 310/42, 89, 91, 85, 74, 80, 83; 339/127; 24/221, 222, 224; 248/223

[56] References Cited

UNITED STATES PATENTS

| | | | |
|---|---|---|---|
| 3,448,306 | 6/1969 | Murray | 310/162 |
| 3,268,751 | 8/1966 | Nebiolo | 310/162 |
| 3,175,110 | 3/1965 | Kohlhagen | 310/164 |
| 3,308,315 | 3/1967 | Mahon | 310/164 |
| 3,080,634 | 3/1963 | Lindblad | 24/221 |

*Primary Examiner*—J. D. Miller
*Assistant Examiner*—R. Skudy
*Attorney*—Richard H. Childress, Robert F. Meyer and Henry W. Cummings

[57] ABSTRACT

A synchronous motor is coupled to a gear train through their respective housings. The housings are coupled together by tabs which extend from the motor housing to engage the gear train housing through apertures formed in its housing.

5 Claims, 6 Drawing Figures

PATENTED JUL 11 1972 3,676,725
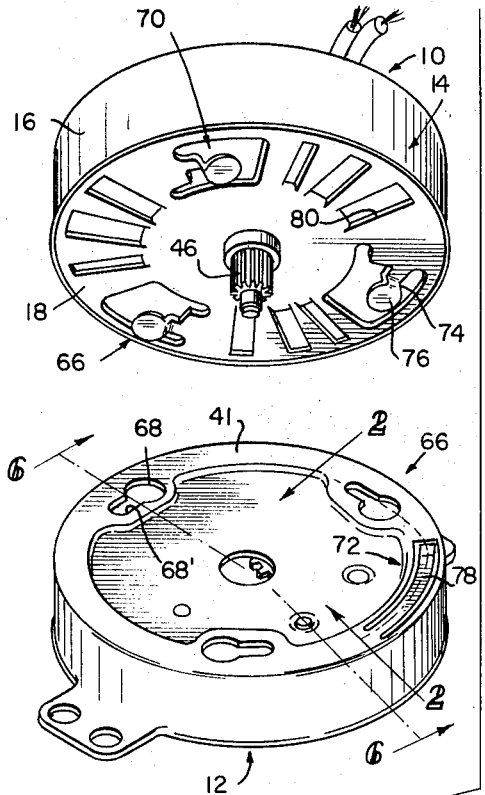
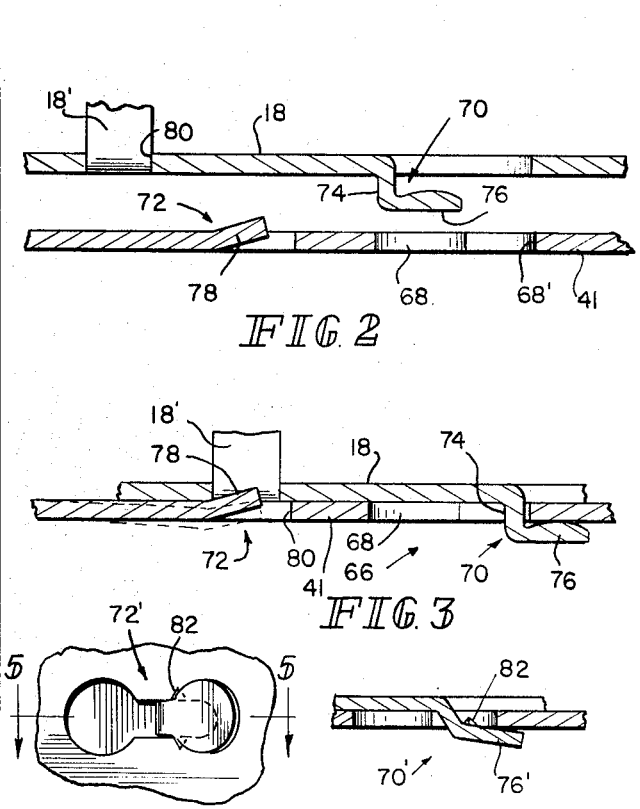
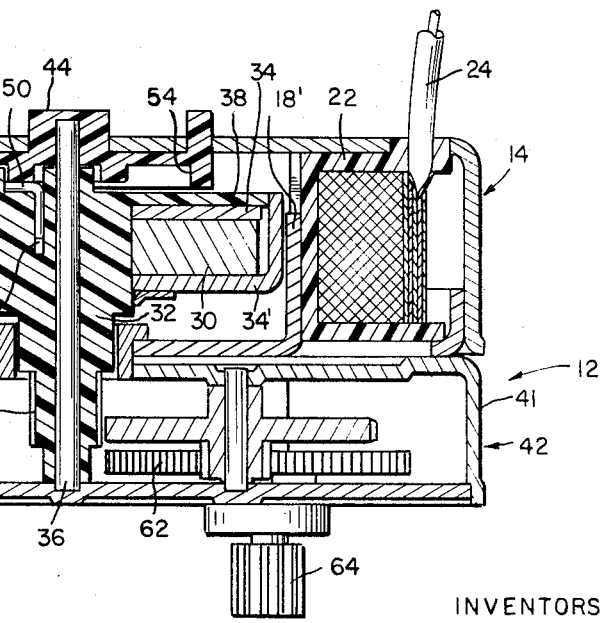
INVENTORS
JOSEPH E. WISER
PETER H. GERHARDT
BY Robert Meyer
ATTORNEY

MEANS CONNECTING A SYNCHRONOUS MOTOR TO A GEAR TRAIN HOUSING

The present invention relates generally to synchronous motors and the gear trains associated therewith; and more particularly, to a means of coupling the two together.

A multitude of applications for synchronous motors of the type using a permanent magnet rotor are known. Such applications include, for example, a drive means for timing devices such as electric clocks and the like, and as a drive means for sequence timers, such as the type used with washing machines, dishwashers, dryers and the like.

The synchronous motor has a high R.P.M. output which must be reduced significantly, if the motor is to be used with the sequence timer. The generally accepted practice is to reduce the output speed of the motor by interposing the gear reduction means between the output of the motor and the input of the sequence timer. In some type of constructions, the gear train cooperatively associated with the motor is incorporated within the housing retaining the motor. With this type of construction, it may be necessary to replace the entire motor assembly if any one of the gear teeth of the gear train becomes crowned or reaches the end of its useful life through some type of failure. In addition, if a different output speed is required, it would be entirely possible that the entire motor assembly would need to be replaced rather than merely replacing the inexpensive gear train.

To this end, the art has, in recent years, enclosed a synchronous motor and the gear train in separate housings. This type of construction leads to the problem of coupling the two housings together such that the motor pinion is always in exact alignment with the first gear or pinion of the gear train. Furthermore, a coupling means should be of such a construction that the gear train is easily disconnected from the housing of the motor such that the output speed can be readily changed.

The present invention is concerned with synchronous motors, and more particularly, to the combination of a synchronous motor and a gear train and has as one of its objects the provision of a means coupling the gear train to the synchronous motor.

Another object of the invention is to provide a synchronous motor-gear train combination wherein there are tab means extending outwardly from the shell of the motor adapted to engage apertures in the housing for the gear train so as to couple the two together.

Still another object of the invention is to provide the combination of a synchronous motor and a gear train having means coupling the housing for the gear train and the shell of the motor together which will insure that the output pinion of the motor is accurately aligned with the input gear or pinion of the gear train.

Yet still another object of the invention is to provide a combination synchronous motor and gear train having a means coupling the gear train housing and the shell of the motor together wherein the gear train housing can be readily disconnected and connected to the shell.

Yet still another object of the invention is the provision of the combination of a synchronous motor and a gear train having means connecting the gear train housing to the motor housing further including means locking the two together.

These and other objects of the invention will become apparent from the following description taken in conjunction with the accompanying drawings wherein:

FIG. 1 is an exploded view showing the relationship between a synchronous motor and a gear train;

FIG. 2 is a partial section taken along the line 2—2 of FIG. 1 with the motor and the gear train about to be assembled together;

FIG. 3 is a partial section taken along the line 2—2 of FIG. 1 with the motor and the gear train connected;

FIG. 4 is a top view of another embodiment of the means connecting the housings for the gear train and the motor together;

FIG. 5 is a view taken along the line 5—5 of FIG. 4; and

FIG. 6 is a cross section taken along the line 6—6 of FIG. 1 showing the synchronous motor and the gear train connected together.

Generally speaking, the objects of the invention are accomplished by providing a synchronous motor in combination with a gear train means, the synchronous motor and the gear train means each including housing means, the synchronous motor housing means including a shell, stator poles lanced from the shell, and tab means extending outwardly from the shell, the gear train housing means including apertures receiving the tab means whereby the gear train housing is secured to the synchronous motor housing means. A locking means is carried by the gear train housing means and engages the shell to aid in locking the gear train housing means to the shell.

Referring now to the drawings, there is shown a synchronous motor 10 and a gear train 12 adapted to be coupled to the synchronous motor to regulate the output speed of the motor. The synchronous motor includes a housing means 14 which includes shells 16 and 18 fabricated from any suitable magnetic materials, such as cold-rolled steel or the like. A plurality of stator poles 16' and 18' are lanced in radial fashion so as to be substantially at right angles with the shells and are in spaced parallel relationship. The stator poles of shell 16 are interleaved with the stator poles of shell 18 and are predeterminately angularly positioned with respect to one another.

A field coil 20 is wound on annular bobbin 22. Bobbin 22 is carried in the annular space between the shells and their stator poles. The coil 20 includes an electrical lead 24 which may be coupled to any suitable AC power source (not shown). Bobbin 22 includes a boss means 26 which engages with predetermined apertures in shell 16 to properly locate the coil.

Journalled between the shells 16 and 18, and more precisely, the stator poles 16' and 18', is a rotor means 28. Rotor means 28 includes a permanent magnet means 30 carried by a hub portion 32, pole means 34 and 34' substantially surrounding the permanent magnet means 30, and shaft means 36. Hub means 32 includes a substantially flat flange portion 38 which serves as a structural member to align the pole pieces 34 and 34' in some suitable manner. For example, notches could be formed in the flange 38 to receive the respective pole pieces. Shaft means 36 is fixedly carried by the bottom plate 40 of the gear train housing means 42 and support member 44. Hub means 32, which also includes a motor output pinion 46, rotates about the shaft means 36.

The lowermost surface of the permanent magnet means 30 includes a pole face of one polarity while the uppermost surface of the permanent magnet includes a pole face of opposite polarity. The permanent magnet may be fabricated from any suitable hard ferrite material. The polarity of poles 34 assumes the polarity of the upper most surface of the magnet means, while the polarity of rotor poles 34' assumes the polarity of the lowermost surface of the magnet. The rotor poles are fabricated from any suitable magnetic soft material such as cold-rolled steel and the like. They are interleaved so that adjacent rotor pole faces have an opposite polarity.

Also included as part of the synchronous motor is a one-way directional means 48. One-way directional means 48 includes a Z-shaped spring 50, a polarity of ramps 52 formed on the inner surface 54 of support member 44. Z-shaped spring 50 is held in aperture 56 and is further held in proper location by a boss means 58 extending from flange 38. If the motor starts to rotate in the right direction, spring 50 will ride over the ramp 52, whereas, if the motor starts in the wrong direction, spring 50 will engage a sharp drop-off face of the ramp. Rotation of rotor means 28 and thus output pinion 46 is caused by the interaction of the magnetic fields when an AC current is applied to the coil 20.

Gear train means 12 includes a plurality of gears and/or pinions 62 which are coupled to motor output pinion 46, and output pinion 64. The number and size of the gears and/or pinions is dependent upon the speed desired. Gear train housing means 42 includes a cup-shaped member 41 closed by a bottom plate 40.

The motor 10 is connected to the gear train means 12 by connecting shell 18 to the cup-shaped member 41 of the gear train housing means through connecting means 66. Connecting means 66 includes keyhole-shaped apertures 68 cut in cup-shaped member 41, tab means 70 and locking means 72. Tab means 70 includes a neck portion 74 and a head portion 76, the head portion being spaced from and substantially parallel to the outer surface of shell 18. Although not necessary, the tab means 70 are lanced or otherwise cut from the shell member 18. Referring to FIGS. 2 and 3, tab means 70 is positioned over the keyhole-shaped apertures 68 and then the head portion 76 is mated into the apertures with the tab means 70 then being arcuately displaced through rotation of the motor 10. This causes the head portion 76 to slide under the reduced portion 68' (FIG. 3) of the keyhole-shaped apertures. Although this securely connects the gear train housing means to the motor housing means through the interference fit, locking means 72 further insures a good secure connection. Locking means 72 includes a spring member 78 lanced or otherwise cut from the rim of cup-shaped member 41 of the gear train housing means 42. When tab means 70 is arcuately displaced in the manner previously described, spring 78 will be biased upward into one of the apertures 80 formed when the stator poles 18' are lanced from shell 18. This will prevent reverse arcuate displacement of the tab means 70 thus further insuring that the tab means will be locked in place.

FIG. 4 and 5 illustrate another embodiment of the invention. In this embodiment, the locking means 72' includes notches 82 cut in the reduced portion 68' of the keyhole-shaped apertures. Further, tab means 70' has the head portion 76' disposed at an angle from the flat surfaces of shell 18 or cup-shaped member 41 such that the head portion cannot be displaced backward due to its engagement with the notches 82.

Thus there is described a combination synchronous motor and a gear train means associated therewith and a means easily connecting the two together, and which also will insure good alignment between the motor output pinion and the gear train.

What is claimed is:

1. In a synchronous motor in combination with a gear train means, said synchronous motor and said gear train means each including housing means, said synchronous motor housing means including a shell and stator poles lanced from said shell, tab means extending outwardly from said shell, keyhole-shaped apertures disposed in said gear train housing means receiving said tab means, displacement of said tab means within said keyhole-shaped apertures a predetermined distance substantially locking said gear train housing means to said synchronous motor housing means, and locking means carried by said gear train housing engaging said shell to further aid in locking said gear train housing means to said shell.

2. In a synchronous motor in combination with a gear train means according to claim 1 wherein said tab means includes a neck portion and a head portion substantially parallel and spaced from said shell.

3. In a synchronous motor in combination with a gear train means according to claim 2 wherein said tab means is lanced from said shell.

4. In a synchronous motor in combination with gear train means according to claim 1 wherein said locking means includes a spring means lanced from said gear train housing means engaging a side of an aperture formed from said lanced stator poles of said shell.

5. In a synchronous motor in combination with a gear train means according to claim 1 wherein said apertures are keyhole-shaped, said tab means includes a neck portion and a head portion, and said head portion is at an angle to said shell.

* * * * *